United States Patent
Murota

(10) Patent No.: US 10,882,156 B2
(45) Date of Patent: Jan. 5, 2021

(54) SPINDLE DEVICE

(71) Applicant: FANUC CORPORATION, Yamanashi (JP)

(72) Inventor: Masahiro Murota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/525,860

(22) Filed: Jul. 30, 2019

(65) Prior Publication Data

US 2020/0039017 A1 Feb. 6, 2020

(30) Foreign Application Priority Data

Jul. 31, 2018 (JP) ................... 2018-143641

(51) Int. Cl.
| | |
|---|---|
| F16C 32/06 | (2006.01) |
| B23B 19/02 | (2006.01) |
| B23Q 11/12 | (2006.01) |
| B23Q 11/08 | (2006.01) |
| B23Q 11/14 | (2006.01) |
| B23Q 1/70 | (2006.01) |

(52) U.S. Cl.
CPC ............. *B23Q 11/127* (2013.01); *B23Q 1/70* (2013.01); *B23Q 11/0883* (2013.01); *B23Q 11/141* (2013.01); *B23Q 2220/006* (2013.01)

(58) Field of Classification Search
CPC . B23Q 11/0883; B23Q 11/127; B23Q 11/141; B23Q 1/70; B23Q 2220/006; B23Q 5/10; Y10T 409/309352
See application file for complete search history.

(56) References Cited

U.S. PATENT DOCUMENTS

| | | | | |
|---|---|---|---|---|
| 4,580,471 A | * | 4/1986 | Oyama | .................... B23Q 5/10 |
| | | | | 310/90 |
| 6,038,948 A | * | 3/2000 | Link | ..................... B23B 31/302 |
| | | | | 279/114 |
| 2003/0094864 A1 | * | 5/2003 | Watanabe | .......... B23Q 11/0883 |
| | | | | 310/58 |
| 2006/0127195 A1 | * | 6/2006 | Hosoe | ................... B23Q 3/183 |
| | | | | 409/131 |

(Continued)

FOREIGN PATENT DOCUMENTS

| | | |
|---|---|---|
| CN | 101885075 A | 11/2010 |
| CN | 206009858 U | 3/2017 |
| JP | 2001310234 A * 11/2001 | ......... B23Q 11/0883 |

(Continued)

OTHER PUBLICATIONS

English Abstract for Japanese Publication No. 2011240428 A, published Dec. 1, 2011, 1pg.

(Continued)

*Primary Examiner* — Sara Addisu
(74) *Attorney, Agent, or Firm* — Fredrikson & Byron, P.A.

(57) ABSTRACT

In a spindle device, a cover member covers a surface of a flange portion on the front side of the spindle shaft, the flange portion projecting radially outward from the outer peripheral surface of the spindle housing, and the outer peripheral surface of the spindle housing extending from the surface of the flange portion toward the front of the spindle shaft. In the cover member, a flow path for allowing a coolant to flow therethrough is formed.

7 Claims, 5 Drawing Sheets

(56) References Cited

U.S. PATENT DOCUMENTS

2011/0280679 A1    11/2011   Morimura

FOREIGN PATENT DOCUMENTS

| | | | | | |
|---|---|---|---|---|---|
| JP | 2003145393 | A | | 5/2003 | |
| JP | 2006336826 | A | * | 12/2006 | .......... F16C 32/0614 |
| JP | 2007245255 | A | | 9/2007 | |
| JP | 2008175273 | A | * | 7/2008 | |
| JP | 2011240428 | A | | 12/2011 | |
| JP | 2015178168 | A | | 10/2015 | |
| JP | 2016172314 | A | | 9/2016 | |
| JP | 2016215329 | A | | 12/2016 | |
| JP | 201812142 | A | | 1/2018 | |

OTHER PUBLICATIONS

English Machine Translation for Japanese Publication No. 2018012142 A, published Jan. 25, 2018, 7pgs.
English Abstract and Machine Translation for Japanese Publication No. JP2003-145393A, published May 20, 2003, 10 pgs.
English Abstract and Machine Translation for Japanese Publication No. JP2007-245255A, published Sep. 27, 2007, 9 pgs.
English Abstract and Machine Translation for Chinese Publication No. CN101885075A, published Nov. 17, 2010, 6 pgs.
English Abstract and Machine Translation for Japanese Publication No. JP2015-178168A, published Oct. 8, 2015, 20 pgs.
English Abstract and Machine Translation for Japanese Publication No. JP2016-172314A, published Sep. 29, 2016, 13 pgs.
English Abstract and Machine Translation for Japanese Publication No. JP2016-215329A, published Dec. 22, 2016, 14 pgs.
English Abstract and Machine Translation for Chinese Publication No. CN206009858U, published Mar. 15, 2017, 9 pgs.

* cited by examiner

SPINDLE DEVICE

CROSS-REFERENCE TO RELATED APPLICATION

This application is based upon and claims the benefit of priority from Japanese Patent Application No. 2018-143641 filed on Jul. 31, 2018, the contents of which are incorporated herein by reference.

BACKGROUND OF THE INVENTION

Field of the Invention

The present invention relates to a spindle device used in a lathe (machine tool) that machines a workpiece using a tool.

Description of the Related Art

There are cases where a spindle housing or the like for accommodating a spindle shaft is thermally deformed due to heat generated during machining on a workpiece, and such thermal deformation causes decrease in machining accuracy. It is therefore important to take countermeasures to suppress the thermal deformation.

For example, Japanese Laid-Open Patent Publication No. 2011-240428 discloses a cooling structure for cooling a spindle by providing coolant passages both in the housing and the spindle so as to circulate a coolant from the coolant passage in the housing to the coolant passage in the spindle and thereby flow the coolant through the inside of the spindle.

SUMMARY OF THE INVENTION

In the cooling structure disclosed in Japanese Laid-Open Patent Publication No. 2011-240428, there is no disclosure of a member for fixing the housing, but there is insufficient cooling of the attached portion between such a member and the housing, so that it is considered that the attached portion is prone to thermally deform, as compared to the other portions. In recent years, there are cases where machining on a workpiece should be controlled at nanometer levels. In such a case, even if the amount of thermal deformation caused during machining is very small, decrease in machining accuracy tends to emerge. Therefore, there is a strong demand for measures to suppress the decrease in machining accuracy due to thermal deformation.

It is therefore an object of the present invention to provide a spindle device which can suppress the decrease in machining accuracy resulting from a thermal deformation.

An aspect of the present invention resides in a spindle device, which includes: a spindle housing; a spindle shaft configured to be rotatably supported inside the spindle housing; a rotating member disposed at one end of the spindle shaft and configured to be rotatable in conjunction with rotation of the spindle shaft; a spindle mount having an insertion cavity into which the spindle housing is inserted along the axial direction of the spindle shaft; an annular flange portion projecting outward from the outer peripheral surface of the spindle housing and configured to be detachably fixed to an end of the spindle mount that is closer to one opening of the insertion cavity; a cover member configured to cover the surface of the flange portion on one end side of the spindle shaft and the outer peripheral surface of the spindle housing that extends from the surface of the flange portion toward the one end side of the spindle shaft; and a flow path formed in the cover member and configured to allow a coolant to flow therethrough.

According to the present invention, even if heat is transferred to the spindle housing, the heat is absorbed by the coolant flowing in the flow path of the cover member. Therefore, the heat of the spindle housing is less likely to be transferred to the flange portion. As a result, thermal deformation of the spindle housing and the flange portion is suppressed, and decrease in machining accuracy due to the thermal deformation can be suppressed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
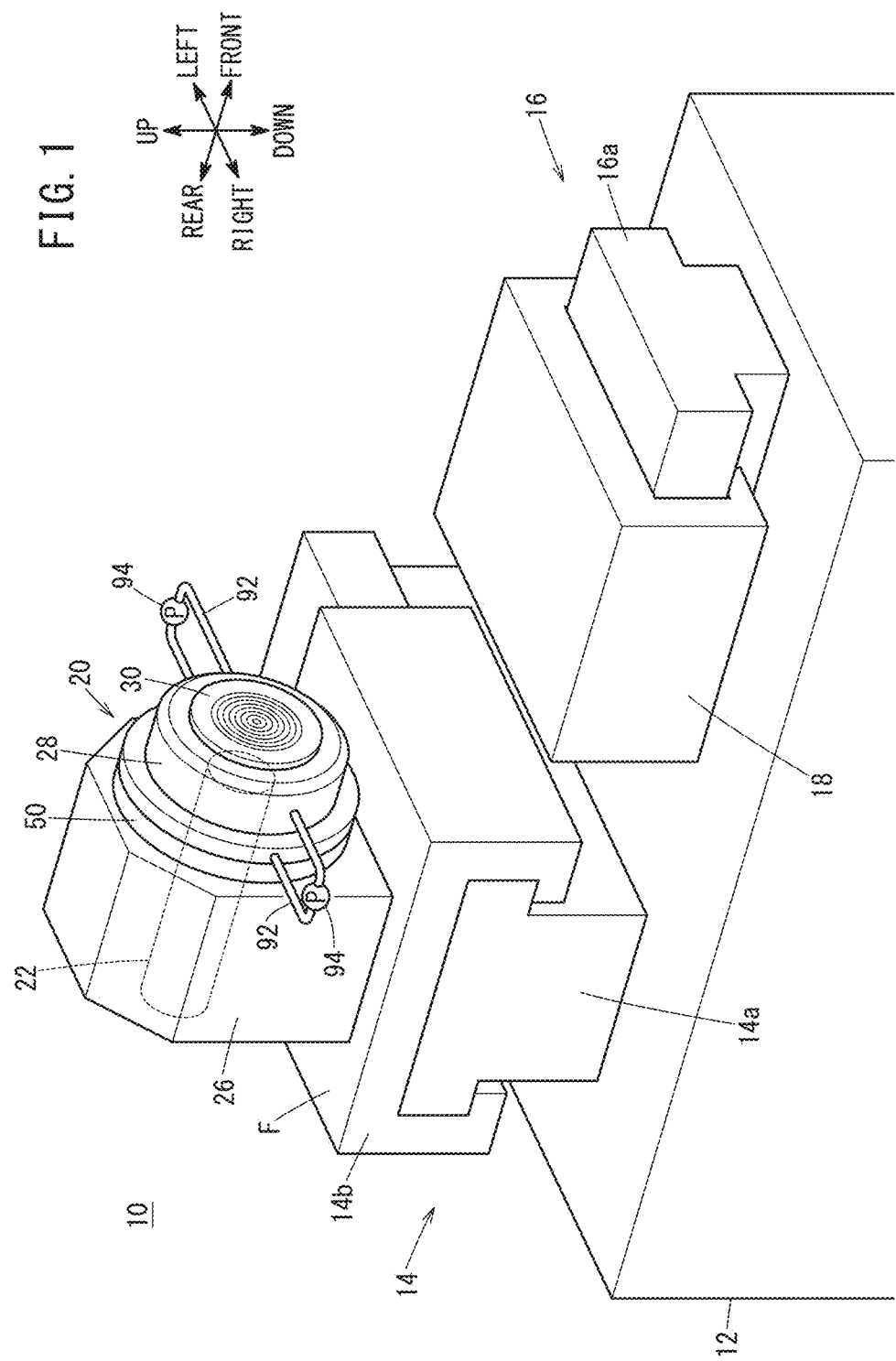
FIG. 1 is a schematic view showing a lathe according to the present embodiment.

FIG. 1 is a schematic view showing an appearance configuration of a lathe machine 10. The lathe machine 10 is used to machine a workpiece to be machined using a tool, and includes a base bed 12, a spindle support 14, a table support 16, a table 18 and a spindle device 20.

The spindle support 14 is provided on the base bed 12 to support the spindle device 20 so that it can move left and right relative to the base bed 12. Here, the direction (axial direction) in which a spindle shaft 22 of the spindle device 20 extends is referred to as the front-rear direction, the direction perpendicular to the axial direction in a plane parallel to a mounting surface F on which the spindle device 20 is mounted is referred to as the left-right direction, and the direction perpendicular to the mounting surface F and the axial direction is referred to as the up-down direction. The downward direction is the direction of gravity. Further, in the spindle device 20, one end side of the spindle shaft 22 on which a chuck portion 30 is arranged is defined as the front side, whereas the other end side of the spindle shaft 22 is defined as the rear side.

The spindle support 14 includes a first slider 14a provided along the left-right direction on the base bed 12, a spindle carriage 14b movable along the first slider 14a, and an unillustrated first drive mechanism for driving the spindle carriage 14b.

The first drive mechanism includes a motor and components such as a ball screw and others that convert the rotational motion of the motor into a linear motion. As the spindle carriage 14b is moved along the first slider 14a by the first drive mechanism, the spindle device 20 on the spindle carriage 14b is moved left and right relative to the base bed 12.

The table support 16 is arranged on the base bed 12 to movably support the table 18 in the front-rear direction with respect to the base bed 12. The table support 16 includes a second slider 16a provided along the front-rear direction on the base bed 12 and an unillustrated second drive mechanism for driving the table 18 that is movable along the second slider 16a.

The second drive mechanism includes a motor and components such as a ball screw that converts the rotational motion of the motor into a linear motion. The table 18 is moved in the front-rear direction relative to the base bed 12 through the second slider 16a by the second drive mechanism. The table 18 may be provided rotatably about a vertical axis as a rotation axis.

In this embodiment, it is assumed that the workpiece is held by the chuck portion 30 of the spindle device 20 and the tool is held by the table 18. However, the tool may be held by the chuck portion 30 of the spindle device 20 and the workpiece may be held by the table 18.

Figure 2:
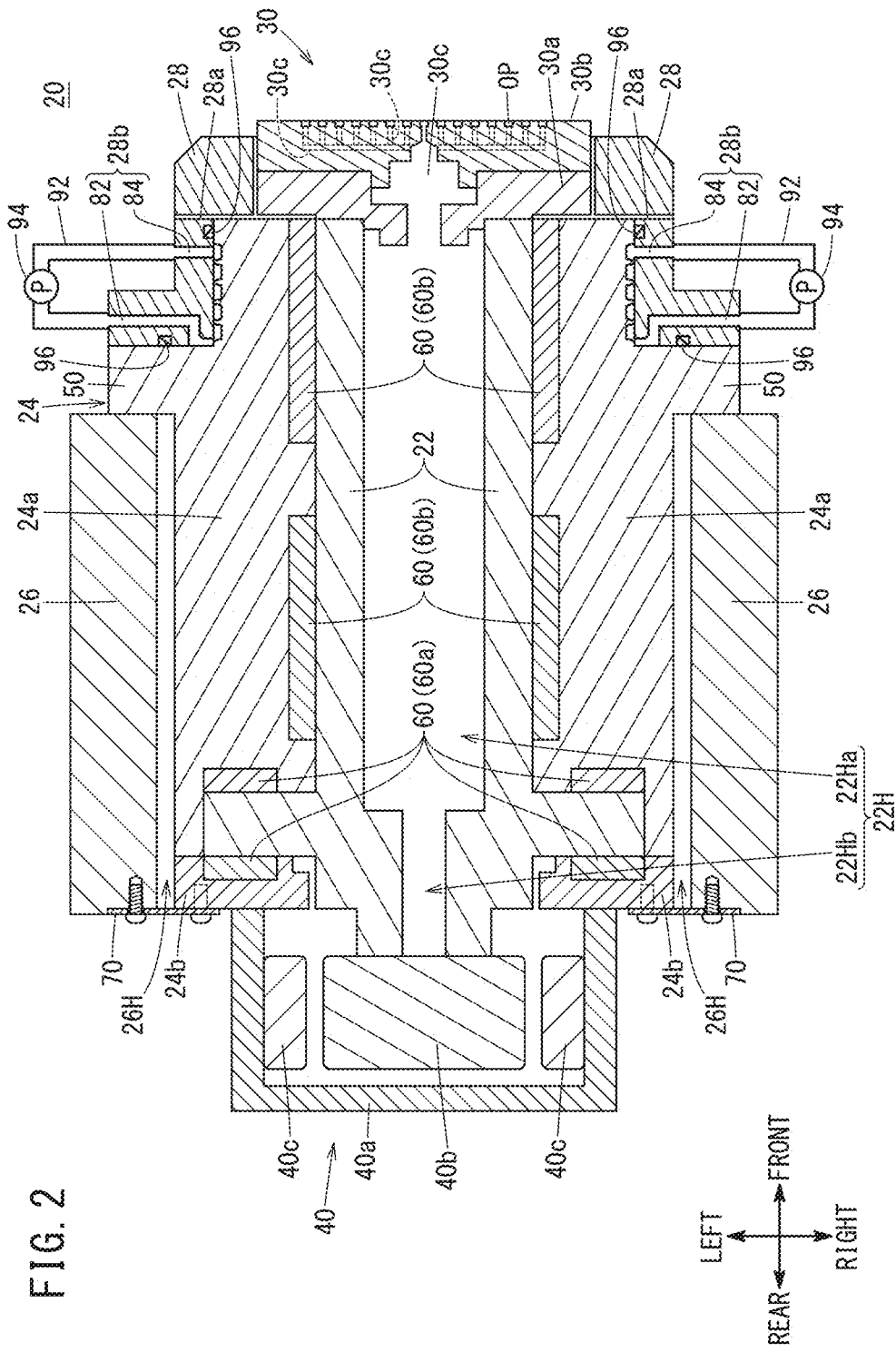
FIG. 2 is a schematic view showing a cross-sectional view of a spindle device of FIG. 1.

FIG. 2 is a sectional view showing the spindle device 20 of FIG. 1. The spindle device 20 of the present embodiment rotatably holds a workpiece, and is used, for example, to machine the workpiece at nanometer-scale control. The spindle device 20 contains, as main components, the spindle shaft 22, a spindle housing 24, a spindle mount 26, and a cover member 28.

The spindle shaft 22 is a cylindrical member and has a cylindrical through-hole 22H penetrating therethrough in the axial direction. In the example shown in FIG. 2, the through-hole 22H has a front side through-hole 22Ha and a rear side through-hole 22Hb having a diameter smaller than that of the front side through-hole 22Ha. The chuck portion 30 is arranged on one end (front side) of the spindle shaft 22, and a motor 40 is provided on the other end (rear side).

The chuck portion 30 is a rotating member that is provided at the one end of the spindle shaft 22 so as to be rotatable in conjunction with rotation of the spindle shaft 22, on the front surface of the spindle housing 24, and in the present embodiment, the chuck portion 30 holds and releases the workpiece. Here, in FIG. 1, although the chuck portion 30 is formed in a disk shape, it may have another shape. The chuck portion 30 has a base 30a fixed on the front side of the spindle shaft 22 and a suction pad 30b detachably attached to the base 30a. The suction pad 30b has openings OP formed in a suction surface thereof. The base 30a and the suction pad 30b contain therein a communication passage 30c to establish communication between openings OP and one end of the through-hole 22H in the spindle shaft 22. In the chuck portion 30, air outside the chuck portion 30 is drawn into the through-hole 22H from the openings OP through the communication passages 30c by an unillustrated vacuum pump, to thereby keep and hold the workpiece in close contact with the suctioning face.

The motor 40 is a drive source of the spindle shaft 22 and includes a motor case 40a attached on the rear side of the spindle housing 24, and also includes a rotor 40b and a stator 40c provided inside the motor case 40a. The spindle shaft 22 is fixed to the rotor 40b. Therefore, the spindle shaft 22 rotates together with the rotor 40b.

The spindle housing 24 includes a substantially cylindrical housing body 24a and a rear housing lid 24b. The housing body 24a is provided with an annular flange portion 50 projecting outward from the outer peripheral surface of the housing body 24a. The flange portion 50 may be formed integrally with the housing body 24a, or may be formed separately from the housing body 24a and fixed to the housing body 24a by predetermined fasteners.

The rear housing lid 24b is removably attached on the rear side of the housing body 24a so as to cover the opening on the rear of the housing body 24a. The motor case 40a of the motor 40 is fixed to the outer (rear endface) side of the rear housing lid 24b.

A substantially cylindrical space for shaft arrangement is defined by the rear housing lid 24b and the housing body 24a so as to extend therethrough in the front-rear direction. The spindle shaft 22 is arranged in the shaft arrangement space, and the spindle shaft 22 arranged in the shaft arrangement space is rotatably supported by bearings 60.

The bearings 60 include thrust bearings 60a and radial bearings 60b in this embodiment. The thrust bearings 60a are arranged on the left and right sides of the spindle shaft 22. The radial bearings 60b are provided on the front and rear sides of a front portion of the spindle shaft 22 that is located at the front side of the thrust bearings 60a. The bearing 60 may be a hydrostatic bearing or a rolling bearing. In the case where the machining on the workpiece should be controlled on a nanometer-scale as mentioned above, use of a hydrostatic bearing is preferable.

The spindle mount 26 is placed on the mounting surface F (FIG. 1) of the spindle carriage 14b. The spindle mount 26 has an insertion cavity 26H into which the spindle housing 24 is inserted along the axial direction of the spindle shaft 22. The front side of the spindle housing 24 inserted in the insertion cavity 26H is fixed to the front side of the spindle mount 26 by the flange portion 50 provided on the housing body 24a, and the rear side of the spindle housing 24 is supported by a support member 70 provided on the rear side of the spindle mount 26.

Specifically, the flange portion 50 is detachably fixed to the front side (one end that is closer to one opening of the insertion cavity 26H) of the spindle mount 26 by rod-shaped fasteners such as bolts. On the other hand, the support member 70 supports the spindle housing 24 by using, a base, the rear side (the other end that is closer to the other opening of the insertion cavity 26H) of the spindle mount 26. That is, the spindle housing 24 is supported on the spindle mount 26 at two ends, i.e., at front and rear of the spindle housing 24.

The cover member 28 is a cover member whose temperature is adjusted. The cover member 28 is provided on the front side of the spindle device 20. Specifically, the cover member 28 is provided so as to cover the front-side surface of the flange portion 50, the outer peripheral surface of the housing body 24a extending forward from the front-side surface, and part of the outer peripheral surface of the chuck portion 30. Although the cover member 28 covers part of the outer peripheral surface of the chuck portion 30, it may be arranged so as to cover the whole of the outer peripheral surface.

The cover member 28 has, formed therein, a gas flow passage 28a for flowing a seal gas in order to seal a seal portion to be sealed (also referred to as a sealed portion). The sealed portion is a gap between the chuck portion 30 and the cover member 28 and a gap between the chuck portion 30 and the housing body 24a. The seal gas may be compressed to a predetermined pressure. Specific examples of the seal gas include air and others.

By supplying the seal gas to the sealed portion, it is possible to prevent chips generated during machining of the workpiece, coolant used at the time of machining, etc., from entering the interior (shaft arrangement space) of the spindle housing 24 through the gap. The seal gas having flowed into the sealed portion is discharged to the outside from the front side of the spindle device 20 and the like.

Further, in the cover member 28, a flow path 28b through which the coolant flows is formed. The coolant is a liquid such as water in the present embodiment, but may be a gas. In the case of the present embodiment, the flow path 28b is formed on both the left and right sides of the cover member 28.

Figure 3:
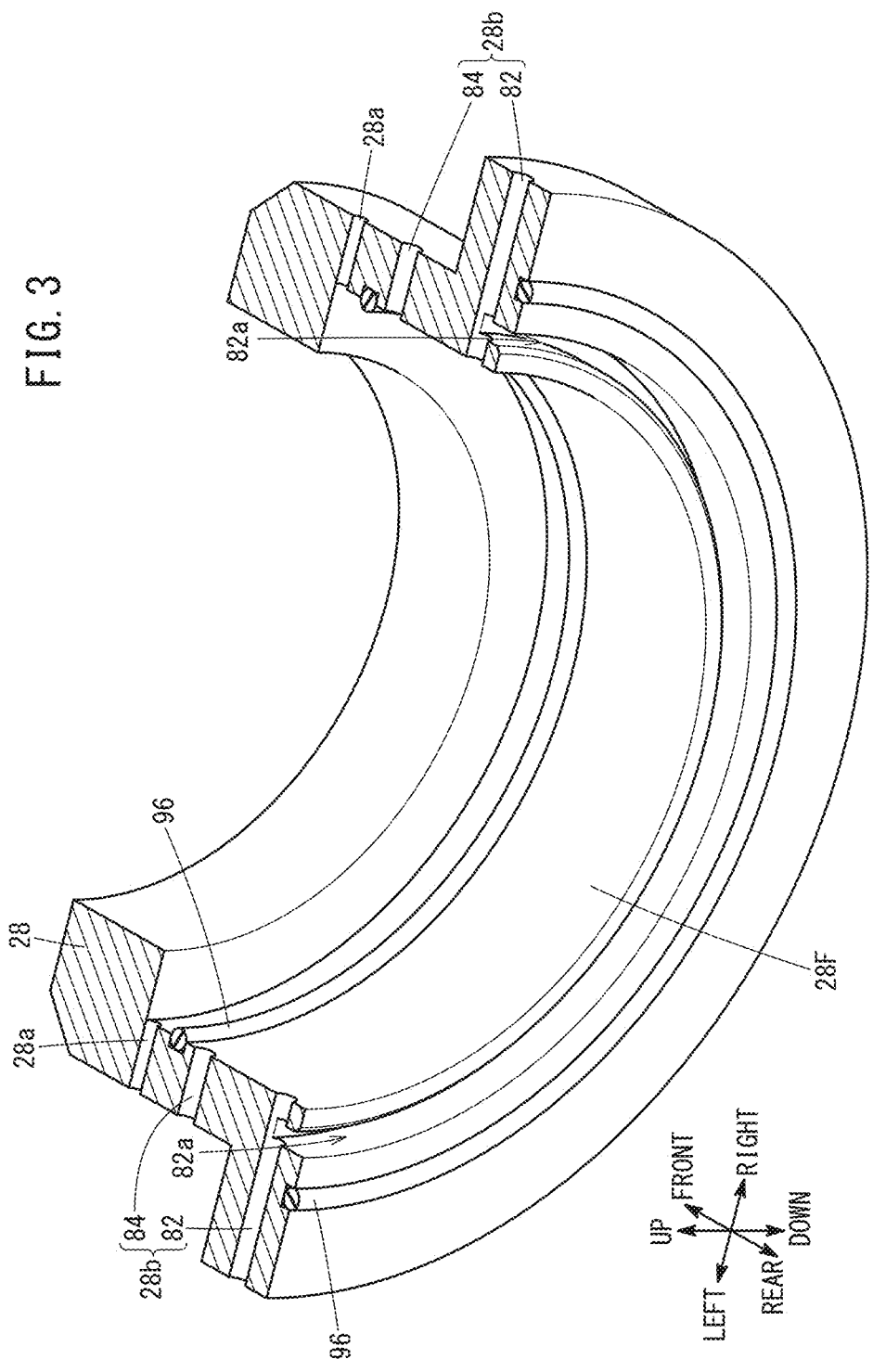
FIG. 3 is a schematic perspective view of a cover member.
Figure 4:
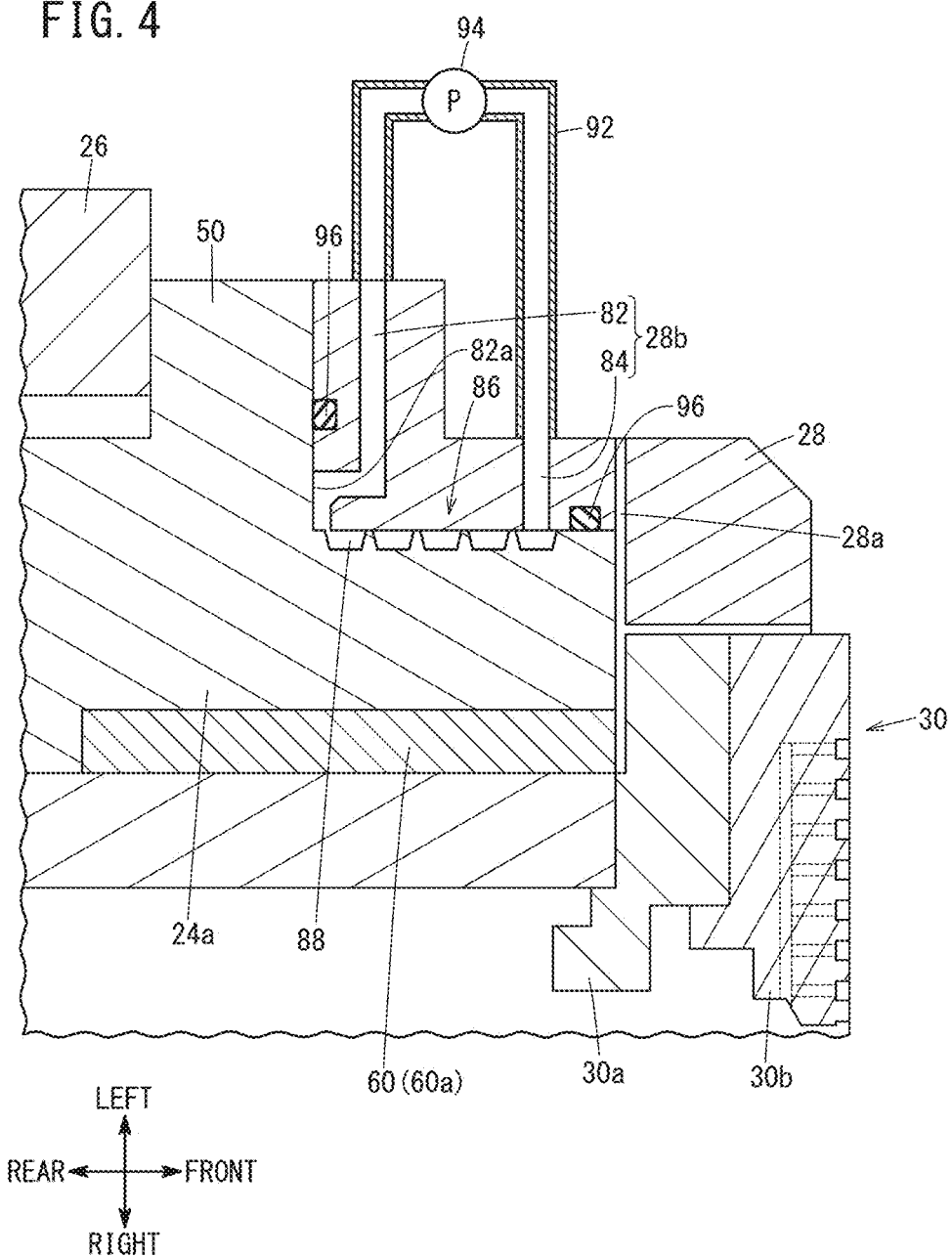
FIG. 4 is an enlarged view showing part of FIG. 2.

FIG. 3 is a schematic perspective view of the cover member 28, and FIG. 4 is an enlarged view of part of FIG. 2. Specifically, FIG. 3 shows a perspective view of part of the cover member 28 as viewed from the rear side, and FIG. 4 shows an enlarged view of the flow path 28b on the left side of the cover member 28 and its surroundings.

The flow path 28b has a first conduit 82 and a second conduit 84. The first conduit 82 allows the outside of the cover member 28 to communicate with the front face of the flange portion 50 covered by the cover member 28. In the present embodiment, the first conduit 82 has an annular portion 82a, which extends circularly along the whole circumference of the flange portion 50 in a state of being in contact with the front face of the annular flange portion 50 covered by the cover member 28 (see FIG. 3).

The second conduit 84 allows the outside of the cover member 28 to communicate with the outer peripheral surface of the housing body 24a covered by the cover member 28. The second conduit 84 and the first conduit 82 are connected via a relay passage (connection passage) 86. The relay passage 86 is a gap (space) formed between the housing body 24a extending forward from the front face of the flange portion 50 and the cover member 28.

The inner peripheral surface 28F (see FIG. 3) of the cover member 28 defining the relay passage 86 is formed into an annular shape. Meanwhile, on the outer peripheral surface of the housing body 24a defining the relay passage 86, a helical groove 88 (see FIG. 4) is formed which extends helically toward the front side of the spindle shaft 22.

The opening on the outer side of the first conduit 82 and the opening on the outer side of the second conduit 84 are connected via a tube 92 that is disposed outside the cover member 28. The tube 92 is provided with a pump 94.

A seal member 96 that prevents the coolant from flowing out to the outside is arranged in a portion of the cover member 28 that is positioned more outward than the opening of the first conduit 82, in the contact area between the cover member 28 and the housing body 24a. Another seal member 96 is arranged in another portion of the cover member 28 that is positioned more outward than the opening of the second conduit 84, in the contact area between the cover member 28 and the housing body 24a. Specific examples of the seal member 96 include an O-ring and the like.

Figure 5:
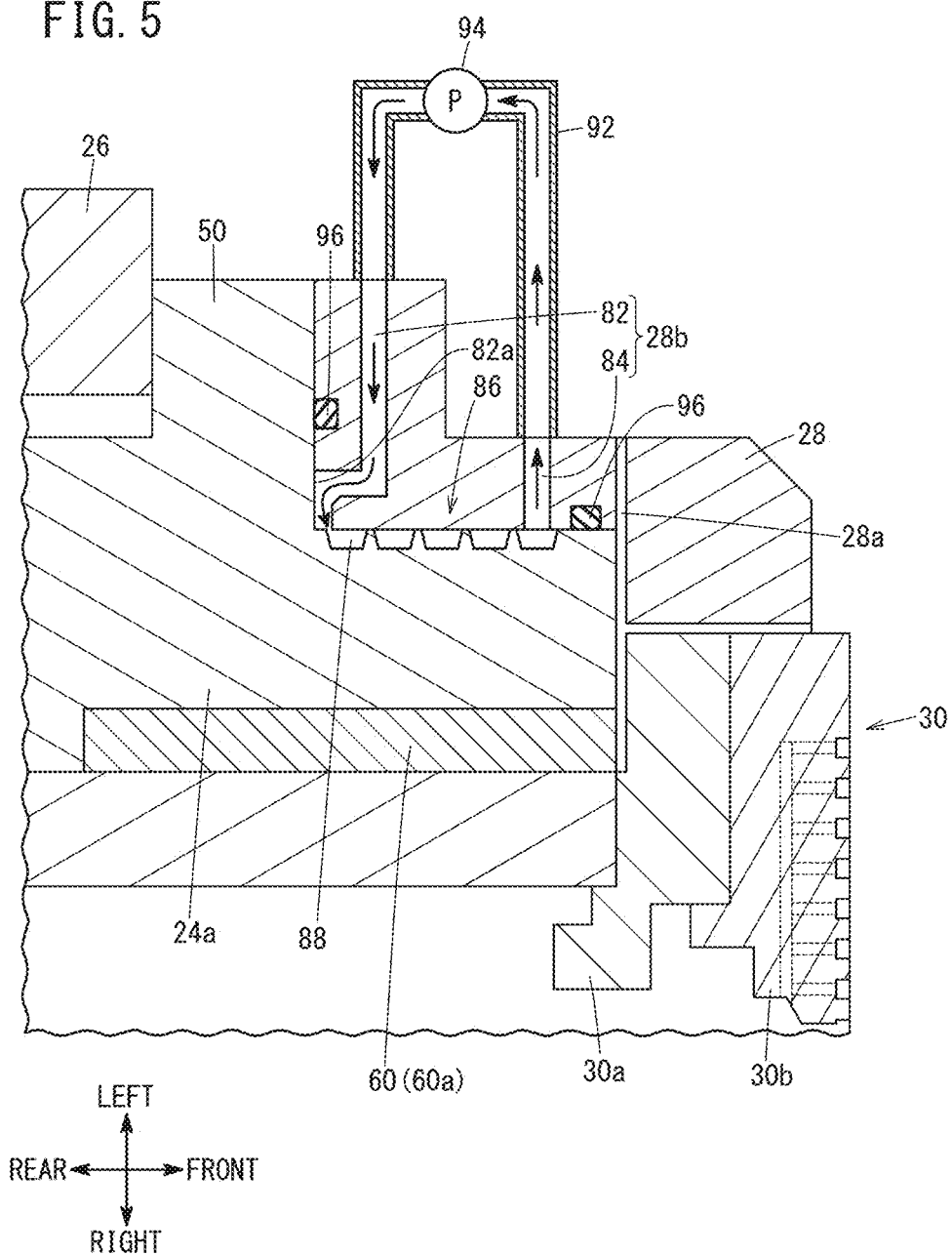
FIG. 5 is a diagram in which the flow of a coolant is added to FIG. 4.

FIG. 5 is a diagram in which the flow of the coolant is added to FIG. 4. The coolant in the tube 92 flows into the first conduit 82 by action of the pump 94. The coolant that has entered the first conduit 82 flows through the first conduit 82, and flows through the annular portion 82a of the first conduit 82, on the front side of the flange portion 50 while being in partial contact with the front face of the flange portion 50.

As described above, the seal member 96 is provided in a portion of the cover member 28 that is positioned more outward than the opening of the first conduit 82 in the contact area between the cover member 28 and the housing body 24a. Therefore, the coolant flowing on the front side of the flange portion 50 through the annular portion 82a enters the relay passage 86 without leaking out to the outside of the cover member 28.

The coolant entering the relay passage 86 flows through the relay passage 86 toward the second conduit 84. Specifically, the coolant having flowed into the relay passage 86 flows through the helical groove 88 formed in the outer peripheral surface of the housing body 24a surrounding the relay passage 86, and flows circumferentially or helically in the circumferential direction of the spindle shaft 22 on the outer peripheral surface of the housing body 24a.

Also, the other seal member 96 is provided in a portion of the cover member 28 that is positioned outward than the opening of the second conduit 84 in the contact area between the cover member 28 and the housing body 24a. Therefore, the coolant flowing through the relay passage 86 flows into the second conduit 84 without leaking out to the outside of the cover member 28. The coolant that has entered the second conduit 84 flows through the second conduit 84 and flows out to the tube 92, and is returned into the first conduit 82 by the pump 94. Thus, the coolant circulates inside and outside the cover member 28.

Both the coolant flowing into the first conduit 82 of the flow path 28b formed on the left side of the cover member 28 and the coolant flowing into the first conduit 82 of the flow path 28b formed on the right side of the cover member 28 flow in the same single relay passage 86. Further, the coolant flowing through the relay passage 86 flows out into the second conduit 84 of the flow path 28b formed on the left side of the cover member 28 and into the second conduit 84 of the flow path 28b formed on the right side of the cover member 28. That is, the relay passage 86 is used in common by the circulation path formed on the left side of the cover member 28 and the circulation path formed on the right side of the cover member 28.

As described above, in the spindle device 20 of the present embodiment, the cover member 28 is configured to cover the front face of the flange portion 50 and the outer peripheral surface of the housing body 24a extending from the flange front face, and the cover member 28 has formed therein the flow path 28b for circulating the coolant.

Therefore, even if heat generated from the radial bearing 60b and the like provided inside the housing body 24a is transferred to the housing body 24a, the heat is absorbed by the coolant flowing in the flow path 28b of the cover member 28. Thus, the heat of the housing body 24a is less likely to be transmitted to the flange portion 50. As a result, thermal deformation of the housing body 24a and the flange portion 50 is suppressed, and it is possible to prevent the fastening between the spindle mount 26 and the flange portion 50 from being loosened, hence suppress displacement of the spindle housing 24 in the axial direction of the spindle shaft 22. As described above, according to the spindle device 20 of the present embodiment, it is possible to suppress a decrease in machining accuracy caused by thermal deformation of the housing body 24a and the flange portion 50.

[Modifications]

Though the above embodiment has been described as one example of the present invention, the technical scope of the present invention should not be limited to the above embodiment. It goes without saying that various modifications and improvements can be added to the above embodiment. It is also apparent from the scope of the claims that embodiments added with such modifications and improvements should be incorporated in the technical scope of the invention. Examples in which the above embodiment is modified or improved will be described below.

In the above embodiment, the flow path 28b is formed on each of the left and right sides of the cover member 28. However, one of the left and right flow paths 28b may be omitted.

In the above embodiment, the relay passage 86 is formed between the cover member 28 and the housing body 24a. However, the relay passage 86 may be formed inside the cover member 28. But, when the relay passage 86 is provided between the cover member 28 and the housing body 24a, the coolant comes in contact with the surface of the housing body 24a, so that ability to absorb heat generated in the cover member 28 can be enhanced as compared to the case where the relay passage is provided inside the cover member 28. That is, in order to increase the heat absorption efficiency of the cover member 28, the relay passage 86 is preferably formed between the cover member 28 and the housing body 24a.

Further, in the above embodiment, the helical groove 88 is formed on the outer peripheral surface (wall surface) of the housing body 24a forming the relay passage 86 so as to extend circumferentially or helically toward the front side of the spindle shaft 22. However, the helical groove 88 may be provided on the inner peripheral surface of the cover member 28 forming the relay passage 86. Further, helical grooves 88 may be formed on both the outer peripheral surface (wall surface) of the housing body 24a forming the relay passage 86 and the inner peripheral surface (wall surface) of the cover member 28 forming the relay passage 86, so as to face each other.

Further, in the above embodiment, the helical groove 88 is formed on the outer peripheral surface (wall surface) of the housing body 24a forming the relay passage 86 so as to extend circumferentially or helically toward the front side of the spindle shaft 22. However, a plurality of annular grooves may be formed on the outer peripheral surface (wall surface) of the housing body 24a forming the relay passages 86 so as to be spaced from each other in the axial direction of the spindle shaft 22. Of the plurality of annular grooves, the grooves adjacent to each other in the axial direction of the spindle shaft 22 are joined to communicate with each other.

Further, in the above embodiment, the first conduit 82 has the annular portion 82a extending circularly along the whole circumference of the flange portion 50 in a state of being in contact with the front face of the annular flange portion 50 covered by the cover member 28. However, the annular portion 82a may be formed inside the cover member 28 without being in contact with the front face of the flange portion 50 covered by the cover member 28. Also, the annular portion 82a may extend along only a part of the annular flange portion 50. Further, as long as the annular portion 82a extends along the flange portion 50, the annular portion 82a may extend with a curvature different from the curvature of the outer peripheral surface of the flange portion 50, and may extend in a meandering manner or in a spiral manner.

Although the first conduit 82 may dispense with the annular portion 82a, in order to enlarge the occupied area of the flow path 28b in the cover member 28, with respect to the flange portion 50, it is preferable that the first conduit 82 has the annular portion 82a.

Though in the above embodiment, the coolant is circulated such that the coolant flows into the first conduit 82 and flows out from the second conduit 84, the coolant may be circulated such that the coolant flows into the second conduit 84 and flows out from the first conduit 82. However, in order to enhance the cooling efficiency of the flange portion 50, it is preferable that the coolant is circulated such that the coolant flows into the first conduit 82 and flows out from the second conduit 84.

In the above embodiment, the flange portion 50 and the housing body 24a are integrally formed. However, the flange portion 50 and the housing body 24a may be separately formed and fixed together by predetermined fasteners. When the flange portion 50 and the housing body 24a are separated, it is preferable that a seal member such as an O-ring is provided between the flange portion 50 and the housing body 24a.

The above-described embodiment and the above-described Modifications may be combined arbitrarily as long as no technical inconsistency occurs.

[Technical Ideas]

Technical ideas that can be grasped from the above-described embodiment and Modifications will be described below.

The spindle device (20) includes a spindle housing (24), a spindle shaft (22), a rotating member (30), a spindle mount (26), a flange portion (50), and a cover member (28).

The spindle shaft (22) is rotatably supported inside the spindle housing (24). The rotating member (30) is disposed at one end of the spindle shaft (22) and configured to rotatable in conjunction with rotation of the spindle shaft (22). The spindle mount (26) has an insertion cavity (26H) into which the spindle housing (24) is inserted along the axial direction of the spindle shaft (22). The annular flange portion (50) is detachably fixed to an end of the spindle mount (26) that is closer to the one opening of the insertion cavity (26H) and projects outward from the outer peripheral surface of the spindle housing (24). The cover member (28) covers the surface of the flange portion (50) on the one end side of the spindle shaft (22) and the outer peripheral surface of the spindle housing (24) that extends from the surface of the flange portion toward the one end side of the spindle shaft (22). The flow path (28b) is formed in the cover member (28) and configured to allow a coolant to flow therethrough.

In the thus configured spindle device (20), even if heat is transferred to the spindle housing (24), the heat is absorbed by the coolant flowing in the flow path (28b) of the cover member (28). Accordingly, heat is unlikely to be transmitted from the spindle housing (24) to the flange portion (50). As a result, thermal deformation of the spindle housing (24) and the flange portion (50) is reduced, so that decrease in machining accuracy caused by the thermal deformation can be suppressed.

The flow path (28b) may include: a first conduit (82) configured to allow the outside of the cover member (28) to communicate with the surface of the flange portion (50) covered by the cover member (28); and a second conduit (84) configured to allow the outside of the cover member (28) to communicate with the outer peripheral surface of the spindle housing (24) covered by the cover member (28). In this case, the coolant flowing from the outside of the cover member (28) into one of the first and second conduits (82, 84) may flow out into the other of the first and second conduits (82, 84) through a relay passage (86) formed between the cover member (28) and the spindle housing (24). Since this configuration enables the coolant to contact the surface of the spindle housing (24), the spindle housing (24) can be directly cooled. Therefore, it is possible to enhance the cooling efficiency of the spindle housing (24).

At least one of the wall surface of the cover member (28) forming the relay passage (86) and the wall surface of the spindle housing (24) forming the relay passage may have, formed therein, a helical groove (88) helically extending toward the one end side of the spindle shaft (22). This configuration makes it possible to increase the amount of coolant flowing through the relay passage (86) as compared to the case where the groove (88) is not formed, hence improve the cooling efficiency easily. When the groove (88) is formed on the wall surface of the spindle housing (24), the contact area of the coolant with the spindle housing (24) can be increased so as to enhance the cooling efficiency of the spindle housing (24).

The first conduit (82) may be configured to have an annular portion (82*a*) extending circumferentially along the flange portion (50). This configuration can increase the occupied area of the flow path (28*b*) in the cover member (28), compared to the case without the annular portion (82*a*), thus making it possible to enhance the cooling efficiency of the spindle housing (24).

The flow path (28*b*) may include plural pairs of the first conduit (82) and the second conduit (84), and the relay passage (86) through which the coolant flows after having flowed into one of the first and second conduits (82, 84) in each pair may be used in common by the plural pairs. With this configuration, provision of multiple pairs of the first conduit (82) and the second conduit (84) makes it possible to increase the occupied area of the flow path (28*b*) in the cover member (28), hence enhance the cooling efficiency of the spindle housing (24). In addition, as compared with the case where the relay passages (86) are separately provided, the flow velocity of the coolant flowing through the relay passage (86) can be increased so that the cooling efficiency of the spindle housing (24) can be enhanced.

Seal members (96) configured to prevent the coolant from flowing out to the outside, may be arranged between the cover member (28) and the spindle housing (24), respectively, at a portion of the cover member (28) that is positioned more outward than the opening of the first conduit (82) and at a portion of the cover member (28) that is positioned more outward than the opening of the second conduit (84). This arrangement makes it possible to prevent the coolant circulating inside the cover member (28) from escaping through unexpected portions, hence enhance the cooling efficiency of the spindle housing (24).

The flange portion (50) and the spindle housing (24) may be integrally formed. This prevents the coolant flowing between the cover member (28) and the spindle housing (24) from leaking through the gap between the flange portion (50) and the spindle housing (24). Therefore, the cooling efficiency of the spindle housing (24) can be enhanced.

The coolant may be a liquid. In this case, it is easier to increase the thermal conductivity, compared to a gas coolant. Therefore, the cooling efficiency of the spindle housing (24) can be enhanced.

The present invention is not particularly limited to the embodiment described above, and various modifications are possible without departing from the essence and gist of the present invention.

What is claimed is:

1. A spindle device comprising:
   a spindle housing;
   a spindle shaft configured to be rotatably supported inside the spindle housing;
   a rotating member disposed at one end of the spindle shaft and configured to be rotatable in conjunction with rotation of the spindle shaft;
   a spindle mount having an insertion cavity into which the spindle housing is inserted along an axial direction of the spindle shaft;
   an annular flange portion projecting outward from an outer peripheral surface of the spindle housing and configured to be detachably fixed to an end of the spindle mount that is closer to one opening of the insertion cavity;
   a cover member configured to cover a surface of the flange portion on one end side of the spindle shaft and an outer peripheral surface of the spindle housing that extends from the surface of the flange portion toward the one end side of the spindle shaft; and
   a flow path formed in the cover member and configured to allow a coolant to flow therethrough,
   wherein the flow path includes: a first conduit configured to allow outside of the cover member to communicate with the surface of the flange portion covered by the cover member; and a second conduit configured to allow the outside of the cover member to communicate with the outer peripheral surface of the spindle housing covered by the cover member; and
   the coolant flowing from the outside of the cover member into one of the first and second conduits flows out into another one of the first and second conduits through a relay passage formed between the cover member and the spindle housing.

2. The spindle device according to claim 1, wherein at least one of a wall surface of the cover member forming the relay passage and a wall surface of the spindle housing forming the relay passage has, formed therein, a helical groove helically extending toward the one end side of the spindle shaft.

3. The spindle device according to claim 1, wherein the first conduit is configured to have an annular portion extending circumferentially along the flange portion.

4. The spindle device according to claim 1, wherein:
   the flow path includes plural pairs of the first conduit and the second conduit; and
   the relay passage through which the coolant flows after having flowed into one of the first and second conduits in each pair is used in common by the plural pairs.

5. The spindle device according to claim 1, further comprising:
   seal members configured to prevent the coolant from flowing out to outside and arranged between the cover member and the housing body respectively at a portion of the cover member that is positioned more outward than an opening of the first conduit and at a portion of the cover member that is positioned more outward than an opening of the second conduit.

6. The spindle device according to claim 1, wherein the flange portion and the spindle housing are integrally formed.

7. The spindle device according to claim 1, wherein the coolant is a liquid.

* * * * *